(No Model.) 5 Sheets—Sheet 1.

G. L. TYLER.
LEATHER SPLITTING MACHINE.

No. 378,185. Patented Feb. 21, 1888.

WITNESSES:
Chas. S. Gooding.
Robert Wallace.

INVENTOR:
George L. Tyler.
by Wm. A. Macleod
his atty (No Model.) 5 Sheets—Sheet 2.
G. L. TYLER.
LEATHER SPLITTING MACHINE.

No. 378,185. Patented Feb. 21, 1888.

WITNESSES:
Chas. S. Gooding
Robert Wallace

INVENTOR:
George L. Tyler.
by Wm. A. Macleod.
his Atty (No Model.) 5 Sheets—Sheet 3.

G. L. TYLER.
LEATHER SPLITTING MACHINE.

No. 378,185. Patented Feb. 21, 1888.

WITNESSES:
Chas. S. Gooding
Robert Wallace

INVENTOR:
George L. Tyler
by Wm. A. Macleod
his atty (No Model.) 5 Sheets—Sheet 4.

G. L. TYLER.
LEATHER SPLITTING MACHINE.

No. 378,185. Patented Feb. 21, 1888.

WITNESSES:
Chas. S. Gooding
Robert Wallace

INVENTOR:
George L. Tyler,
by Wm A. Macleod
his atty (No Model.) 5 Sheets—Sheet 5.

G. L. TYLER.
LEATHER SPLITTING MACHINE.

No. 378,185. Patented Feb. 21, 1888.

WITNESSES:
Chas. S. Gooding
Robert Wallace

INVENTOR:
George L. Tyler
by Wm A. Macleod
his Atty

UNITED STATES PATENT OFFICE.

GEORGE L. TYLER, OF LYNN, MASSACHUSETTS.

LEATHER-SPLITTING MACHINE.

SPECIFICATION forming part of Letters Patent No. 378,185, dated February 21, 1888.

Application filed October 19, 1885. Serial No. 180,288. (No model.) Patented in England July 8, 1884, No. 9,922, and in Canada July 28, 1884, No. 19,848.

*To all whom it may concern:*

Be it known that I, GEORGE L. TYLER, of Lynn, county of Essex, and State of Massachusetts, have invented a new and useful Improvement in Leather-Splitting Machines, (for which I have obtained a patent in Great Britain, No. 9,922, dated July 8, 1884, and a patent in Canada, No. 19,848, dated July 28, 1884,) of which the following is a full, clear, concise, and exact description, reference being had to the drawings accompanying and forming a part hereof, in which—

Figure 1:
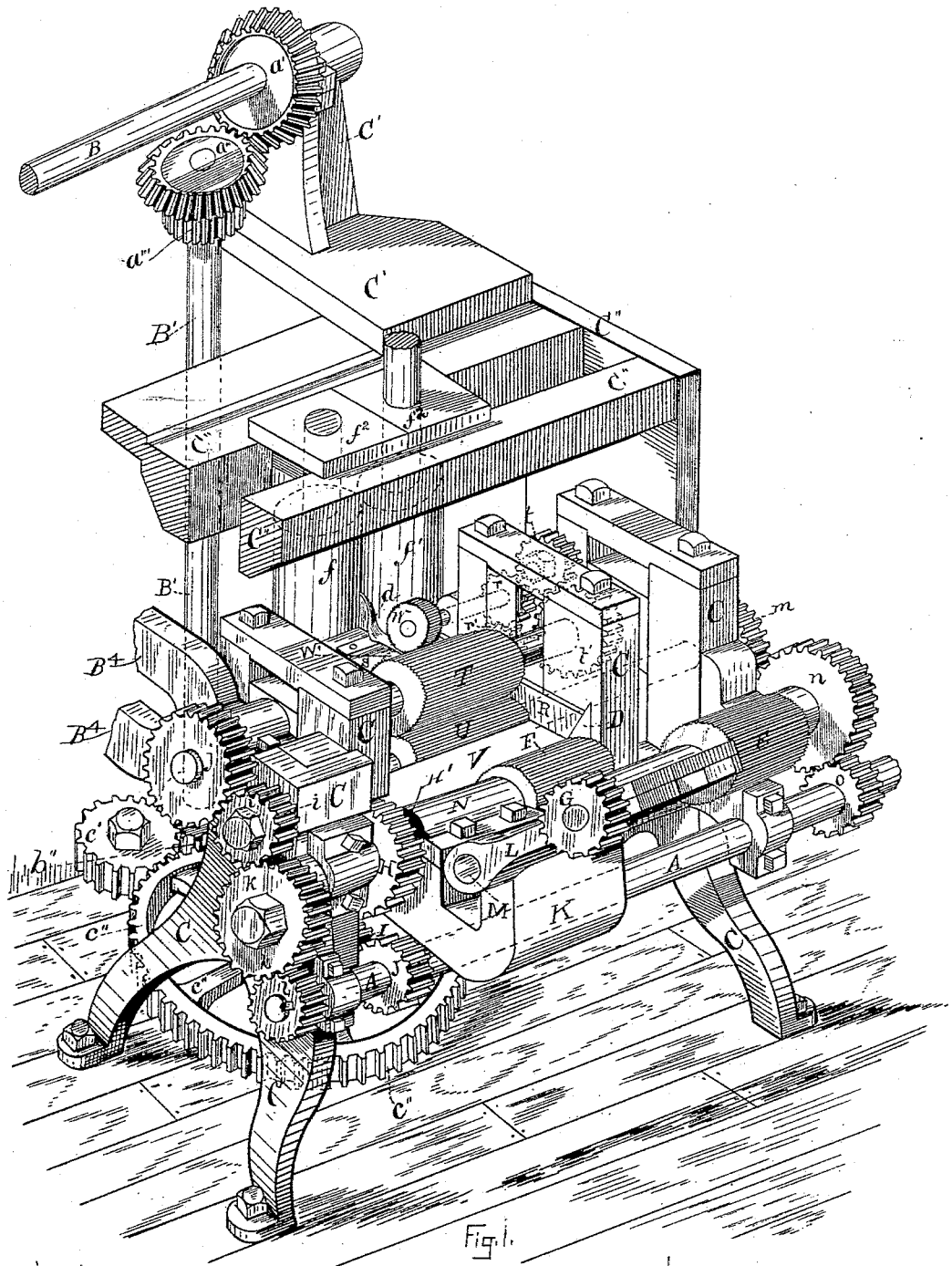
Figure 2:
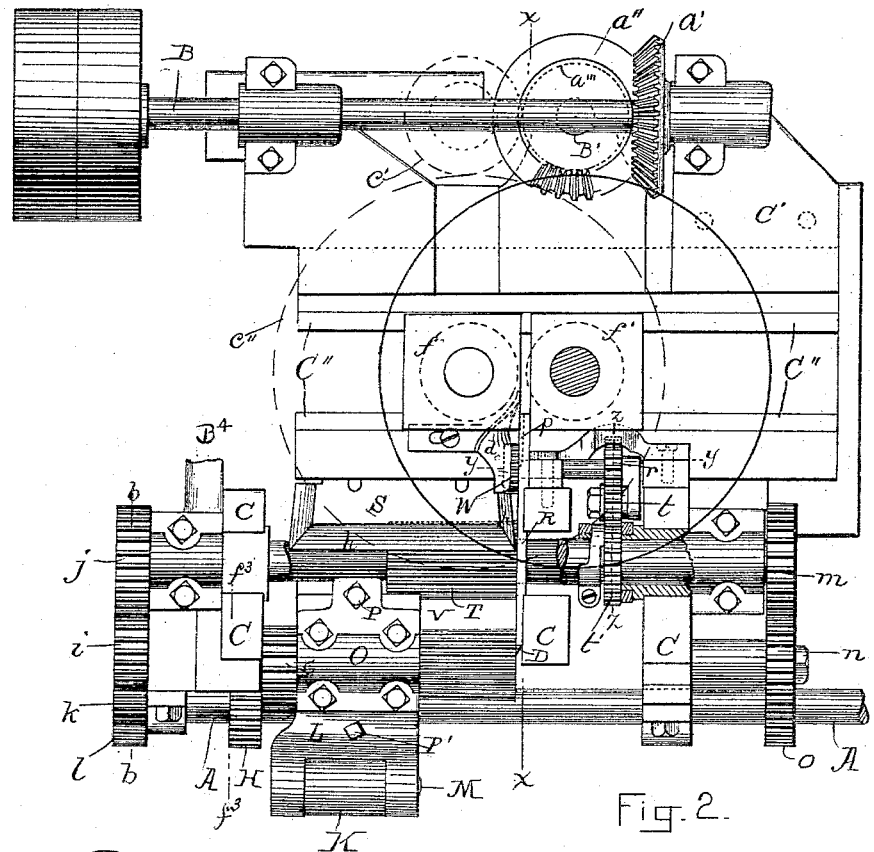
Figure 8:
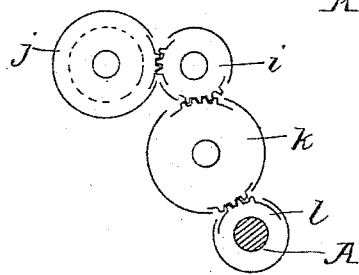
Figure 7:
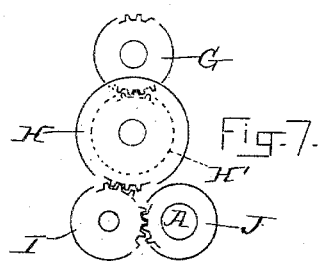
Figure 5:
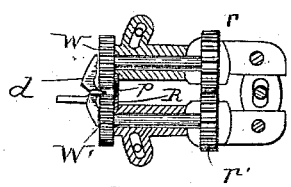
Figure 3:
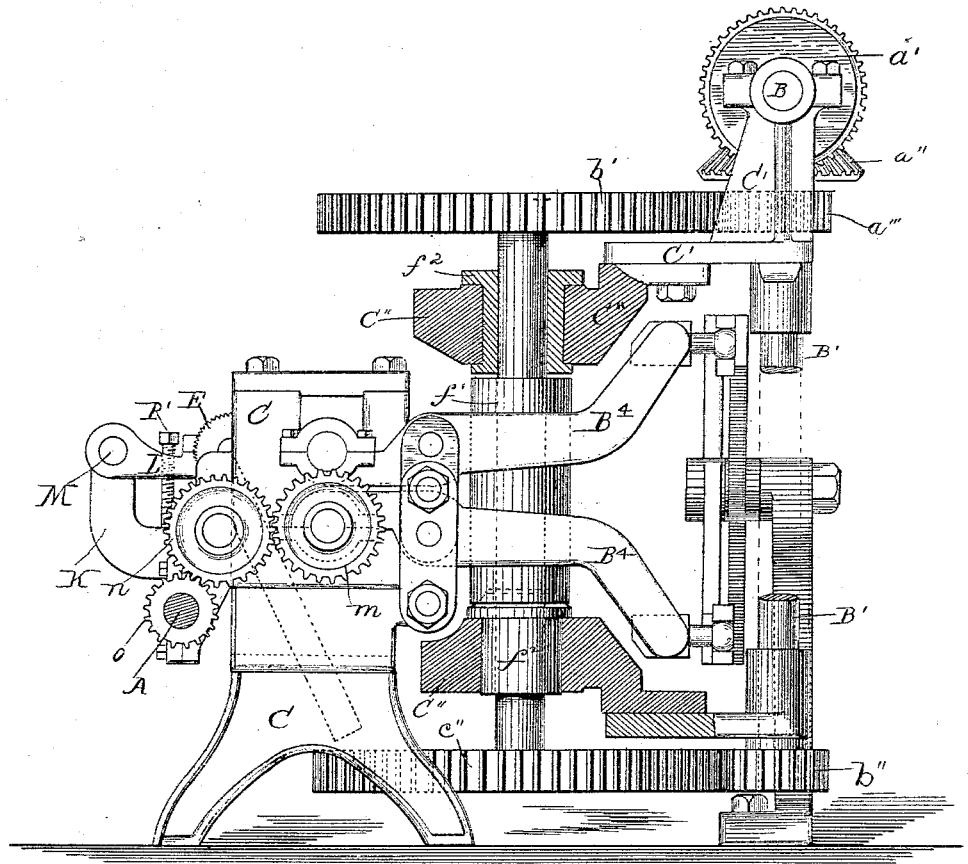
Figures 4, 6:
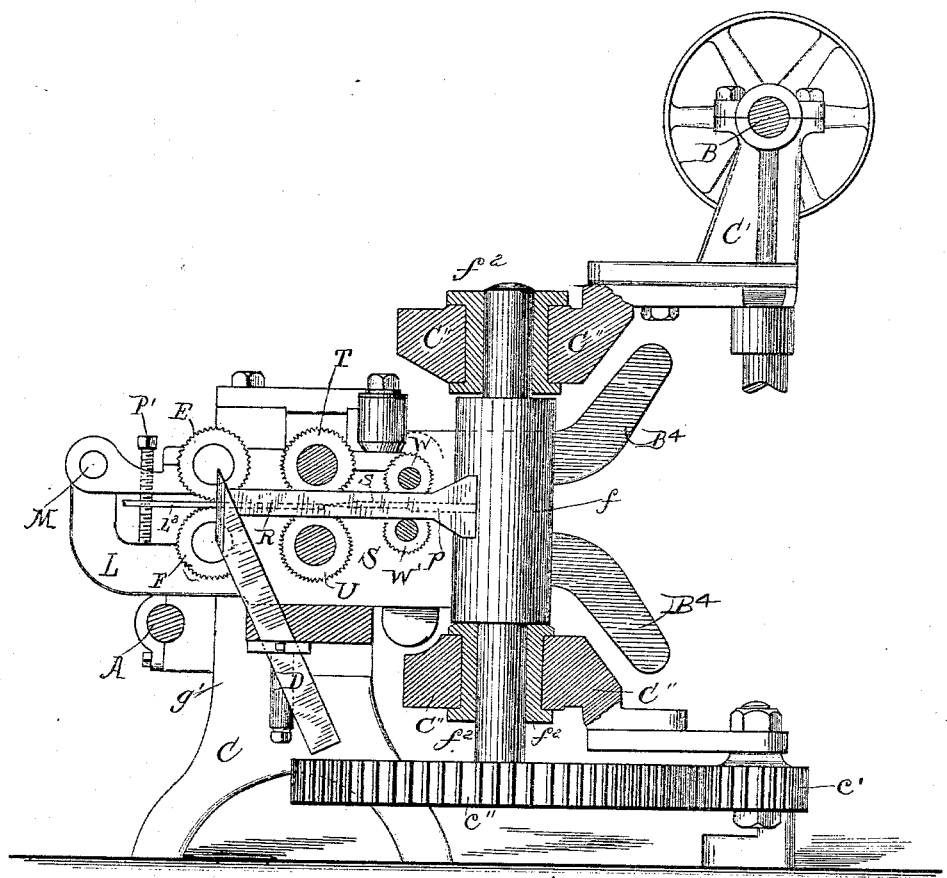
Figure 9:
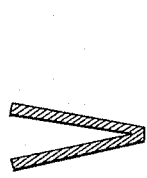
Figure 10:
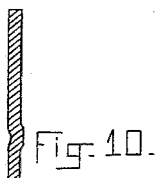
Figure 12:
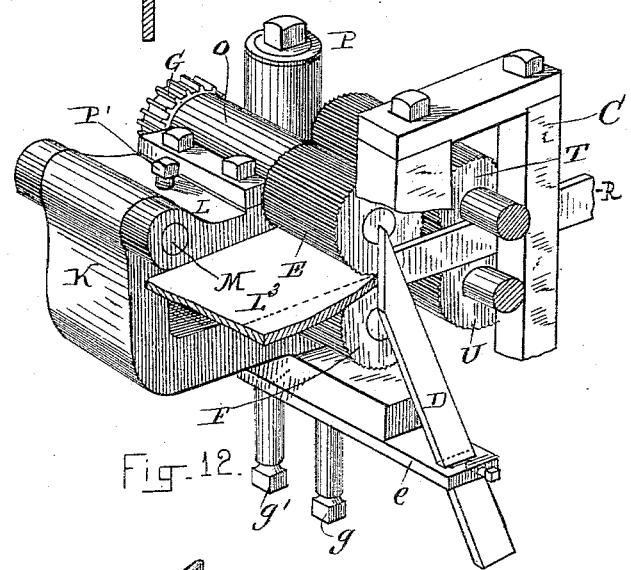
Figure 11:
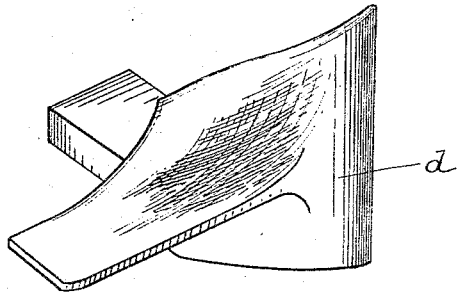
Figure 13:
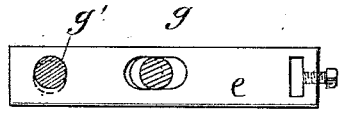

Figure 1 is a perspective view with the upper feed-roll of the trimming or evening attachment thrown back and the gear in the upper end of the shaft of the vertical presser-roll $f'$ removed. Fig. 2 is a plan view with the upper and lower horizontal gears of the vertical pressing-rolls indicated in full and dotted lines, respectively. Fig. 3 is a side elevation. Fig. 4 is a section on line $x\ x$, Fig. 2, and showing the horizontal gear of presser-roll $f$ in full. Fig. 5 is a section on line $y\ y$, Fig. 2, showing in cross-section the device for opening and spreading the flaps of the piece of leather after it has been split. Fig. 6 is a section of the gearing on line $z\ z$, Fig. 2. Fig. 7 is a section showing gearing on line $f^3\ f^3$, Fig. 2. Fig. 8 is a section showing gearing on line $b\ b$, Fig. 2. Fig. 9 is a sectional view of a piece of leather after it has passed the edge-trimming and splitting knives. Fig. 10 is a section of same as it is opened and spread ready to pass through the vertical pressing-rolls. Fig. 11 is a detail of the opener. Fig. 12 is a perspective showing the trimming-knife and its rolls, as also the splitting-knife rolls. A piece of leather, L², is shown passing between the trimming-knife rolls. Fig. 13 is a detail of the trimming-knife holder.

My invention consists in an improved form of leather-splitting machine, by which I am enabled to take small and irregularly-shaped pieces of leather, trim one side of the piece to a straight line or edge, so as to leave the two flaps attached to each other only along the edge, (see Fig. 9,) open and spread the flaps to form a flat sheet (see Fig. 10) having twice the surface of the unsplit piece, and press and set this piece into a flat sheet.

My machine and the various parts thereof as originally made and without the present improvements are shown and described in Letters Patent of the United States Nos. 242,079 and 253,449, granted to me on the 24th day of May, 1881, and on the 7th day of February, A. D. 1882, respectively.

I will describe my present improved machine, using letters of reference to the accompanying drawings.

My machine, constructed as shown, has two driving-shafts, A and B. The lower shaft, A, journaled in the front part of the frame C, drives, through connecting-gears, the feed-rolls to the trimming and splitting knives and to the opener, and the upper shaft, B, acting in like manner, drives the vertical pressing-rolls, all as hereinafter more fully described. D is the vertically-set trimming-knife, past which the leather is fed by the upper and under grooved or corrugated feed-rolls, E and F, set on shafts with the gears G and H′, respectively, which are actuated through gear H, (also set on the shaft of under feed-roll, F, with the gear H′,) and the intermediate gear, I, by gear J, set on the main shaft A. (See Fig. 7.)

A solid frame, K, set on the front of the machine, is provided with a bearing, N, for the shaft of gear H, and also forms a support for the frame L, which carries gear G and its shaft and upper feed-roll, E. The frame L is pivoted to frame K, as shown at M, so that it may be thrown back (see Fig. 1) and the under feed-roll, F, and its gear H′ exposed when for any reason it is desirable to do so. When pieces of leather are to be split which are already straight on one edge, and therefore do not need to be trimmed, the frame L is thrown back and may be entirely removed from the machine by withdrawing the pivot-pin M. When the frame L is thrown forward, the gears G and H′ mesh and the rolls E and F are in position to act. These rolls, as also all the other feed-rolls, are slightly conical in outline—that is, the diameter of the right-hand end of the rolls as viewed, Fig. 1, is slightly larger than the diameter at the left-hand end. This shape of the rolls insures the crowding of the leather slightly to the right, and therefore serves to keep it pressed snugly against the guide R. The upper gear, G, and roll E are held down in position by reason of their shaft being journaled in frame L at O, the frame L being held down on frame K by screw P. A simple bolt, P', screwed into frame L, projects through the frame, and is so set as to come in contact with the frame K and prevent the rolls E F from touching. The screw P regulates the tension of the rolls and is surrounded by a sleeve of rubber, so that as the screw is set down the tension of the upper feed-roll, E, is increased.

The trimming-knife D consists of a strip of steel projecting upward obliquely through a slot in the end of frame C (see Fig. 4) and having a vertical cutting-edge. This edge is on a line with the inner face of guide R, so that the straight edge of the piece of leather formed by the knife passes along the guide. The trimming-knife is adjusted by means of the block $e$, through a slot in the end of which the knife passes, which is secured to the under side of the projecting part of the frame by two eccentric bolts, $g\ g'$. (See Fig. 12.) The bolt $g$ works in a slot in block $e$. (See Fig. 13.) By turning bolt $g$ the outer end of the block $e$ may be thrown to the right, (see Figs. 4 and 12,) which tilts the upper part of the knife-edge forward. The back of the upper end of the knife bears against the end of guide R. By turning bolt $g'$ the lower end of the knife may be thrown toward or away from the frame of the machine, and the cutting-edge correspondingly moved farther from or nearer to the end of the feed-rolls E F. As the leather passes the trimming-knife, its straight edge is crowded against the guide R by the action of the slightly-tapering feed-rolls. In this manner the piece is guided to the splitting-knife S, which is set horizontally behind the upper and under feed-rolls, T and U, respectively, with its edge projecting close in behind the nip of the rolls. (See Fig. 4.) When the leather passes across the space or table V, it is seized between the splitting-knife feed-rolls and forced onto the beveled edge $h$ of the knife, (see Fig. 2,) which is so set with relation to the guide R as to project nearly, but not quite, to the guide, as shown, so that the knife does not split the leather directly at this edge, but very nearly to it, as shown, Fig. 9. Thus the two flaps formed by splitting are hinged to each other along the straight edge.

The splitting-knife feed-rolls are driven directly from the main shaft A through intermediate gears set on spurs on the frame C of the machine. The shaft of the upper roll, T, is provided with gear $j$, which meshes with gear $i$, which meshes with gear $k$, which in turn meshes with gear $l$, set on the main shaft. (See Fig. 8.) The shaft of the under roll, U, is provided at the other end of the machine with the gear $m$, which is actuated through the intermediate gear, $n$, by the gear $o$, set on shaft A. (See Figs. 1 and 3.) After the leather passes the splitting-knife it is seized near the straight edge by a third and shorter pair of feed-rolls, W W', immediately behind and between which projects the point of the opener $d$, (see Fig. 11,) which flares both upward and downward from the plane of nip of the feed-rolls, one-half of it being similar in shape to the mold-board of a plow. The guide R is provided with a groove, $p$, cut in its face, which begins in front of the point of the opener $d$ at a point opposite the nip of the rolls W W' and prevents the edge from flying up as the leather is fed onto the opener $d$, the point of which enters the slit between the flaps immediately after the straight edge of the piece enters the groove $p$. As the piece is fed onto the opener, the flaps are spread or opened by the increasing flare of the opener until they are in the same vertical plane, when they enter between the vertical presser-rolls $f f'$ and are smoothed and pressed into a flat piece which has twice the area of the unsplit piece. After passing the vertical rolls the pieces of leather drop into a receiving box or basket, and are then sorted and ready for use.

The short feed-rolls W W' are set on shafts journaled in upwardly-projecting parts of the frame C and provided with gears $r\ r'$, respectively, which mesh with each other. (See Fig. 5.) The upper gear, $r$, is driven through the intermediate gear, $t$, by gear $t'$, fast on the shaft of upper feed-roll, T.

The vertical presser-rolls $f f'$ are actuated from shaft B, which is journaled in the upper part of frame C', which is bolted below to the rear of frame C. The vertical shaft B', also journaled in the frame C', is connected with the main shaft B by the bevel-gears $a'\ a''$, and the pinion $a'''$ on the vertical shaft meshes with the horizontal gear $b'$, fast to the top of the shaft of the presser-roll $f'$. Another pinion, $b''$, on the lower end of shaft B' is connected, through an intermediate gear, $c'$, (in order to reverse the movement,) with the lower horizontal gear, $c''$, fast to the lower end of the shaft of presser-roll $f$. The shafts of the vertical rolls $f f'$ have their bearings in boxes $f^2 f^2$, adapted to be slid into position between the parallel supports C'' C'' of the frame. (See Fig. 4.)

The device for automatically adjusting the splitting-knife feed-rollers, which is fully described and shown in Letters Patent of the United States No. 253,449, dated February 7, 1882, granted to me, is only partially shown in the accompanying drawings, and has not been referred to in this specification. The arms B⁴ B⁴ (shown broken away in Fig. 1) are a part of this mechanism.

What I claim is—.

1. In a leather-splitting machine, the combination, with an edge-trimming knife and a splitting-knife, of feeding-rolls for carrying the pieces of scrap to be trimmed and split against the said knives, an edge-guide adjacent to the end of the said splitting-knife, but with a space between to leave a hinge in the scrap, and pressing devices for flattening out the pieces which have been split, substantially as set forth.

2. In a leather-splitting machine, the frame K, having a pivoted top, L, in which is journaled the shaft of the feed-roll E, the said top L being provided with bolt P, surrounded with an elastic cushion or washer, by which proper tension of the rolls is obtained, substantially as described.

3. In a leather-splitting machine, the combination, with an edge-trimming knife and a splitting-knife, of feeding-rolls for carrying the pieces of scrap to be trimmed and split against the said knives, an edge guide adjacent to but slightly separated from the end of the said splitting-knife, and pressing-rolls $f\,f'$, for smoothing out the split pieces, substantially as set forth.

4. The guide R, provided rearwardly of the splitting-knife with a groove adapted to receive the unsplit edge of the piece of leather, in combination with the flaring opener $d$, adapted to spread the flaps of the piece until they are in substantially the same plane, all as set forth and described.

5. The combination of the opener $d$, the guide R, and the pressing and smoothing rolls $f\,f'$, substantially as described.

6. The splitting-knife and its feed-rolls, in combination with the opener $d$, guide R, feed-rolls W W', and the pressing-rolls $f\,f'$, for the purposes and substantially as described.

7. A leather-splitting machine consisting of a trimming-knife and its feed-rolls, an edge-guide set rearwardly of and on a line with the face of the trimming-knife, a splitting-knife and its feed-rolls, the splitting-knife being set slightly from the guide, so as to leave the edge of the piece of leather next the guide unsplit, an opener adapted to separate the flaps of the split leather, and the pressing and smoothing rolls, substantially as described.

GEORGE L. TYLER.

In presence of—
WM. A. MACLEOD,
ROBERT WALLACE.